Feb. 21, 1956   J. ZELINKA   2,735,120
MACHINE FOR MANUFACTURE OF SHOE SOLES
Filed Aug. 31, 1951   3 Sheets-Sheet 2
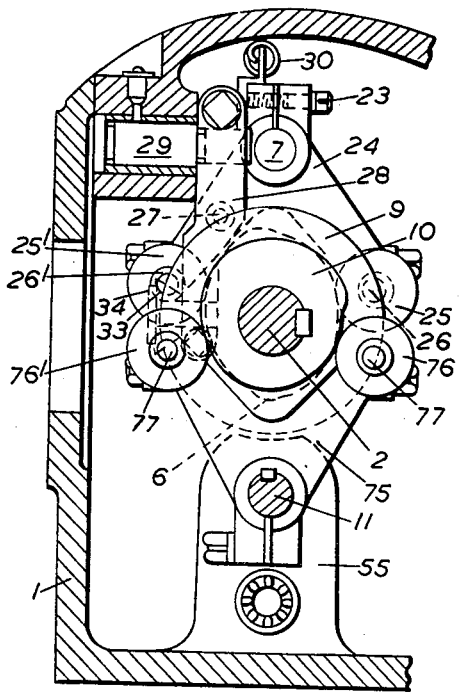
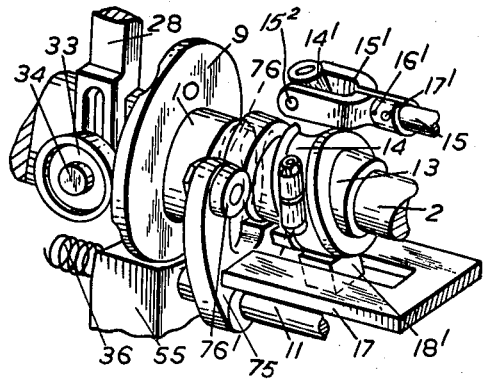
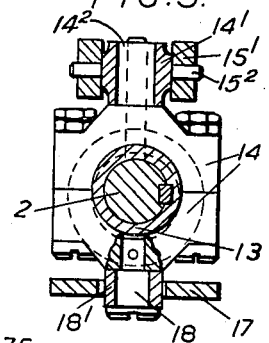
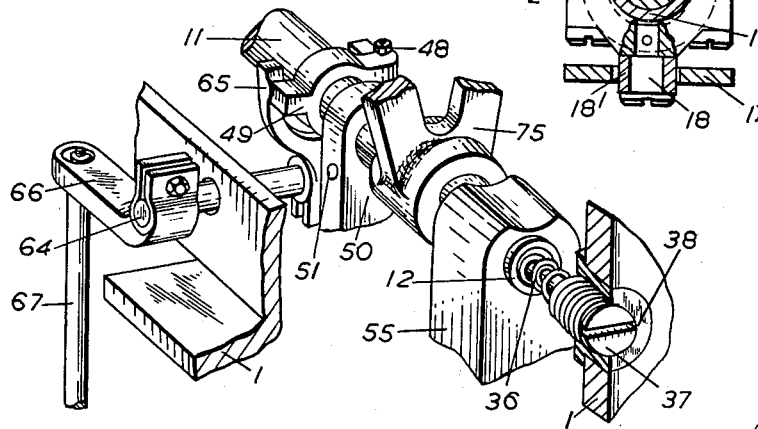
INVENTOR
JOSEF ZELINKA,
BY
John B. Brady
ATTORNEY

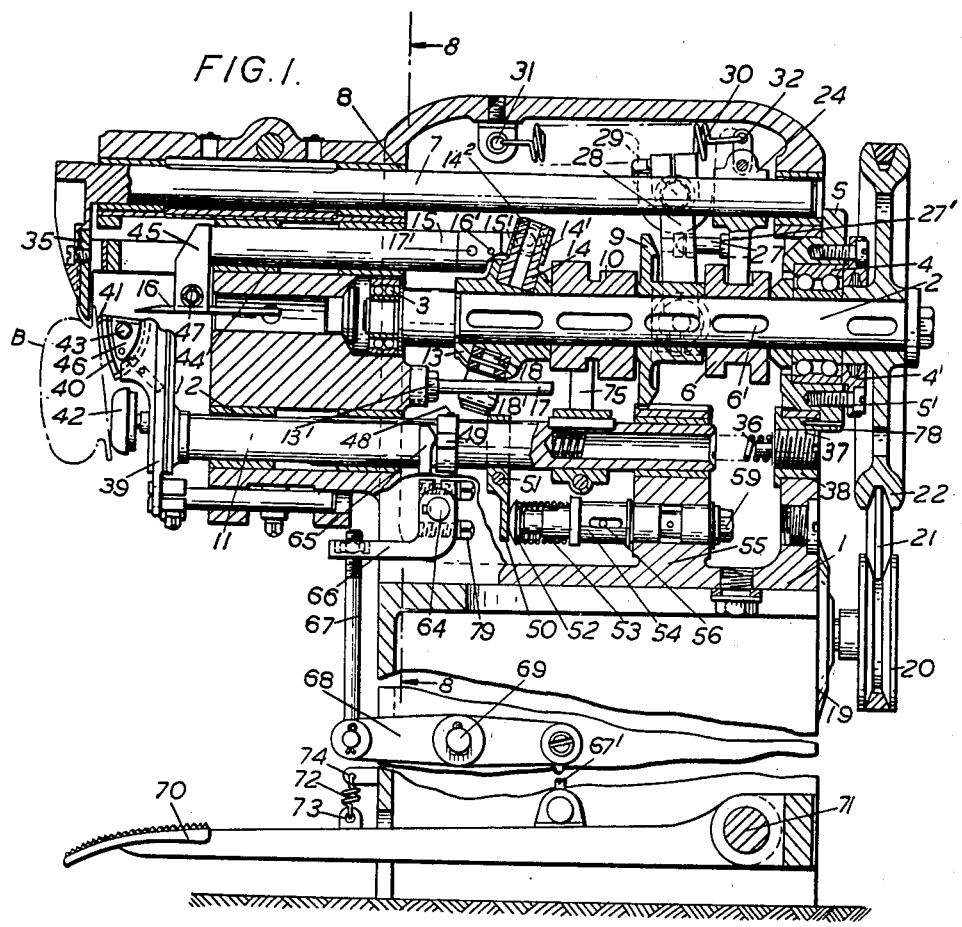

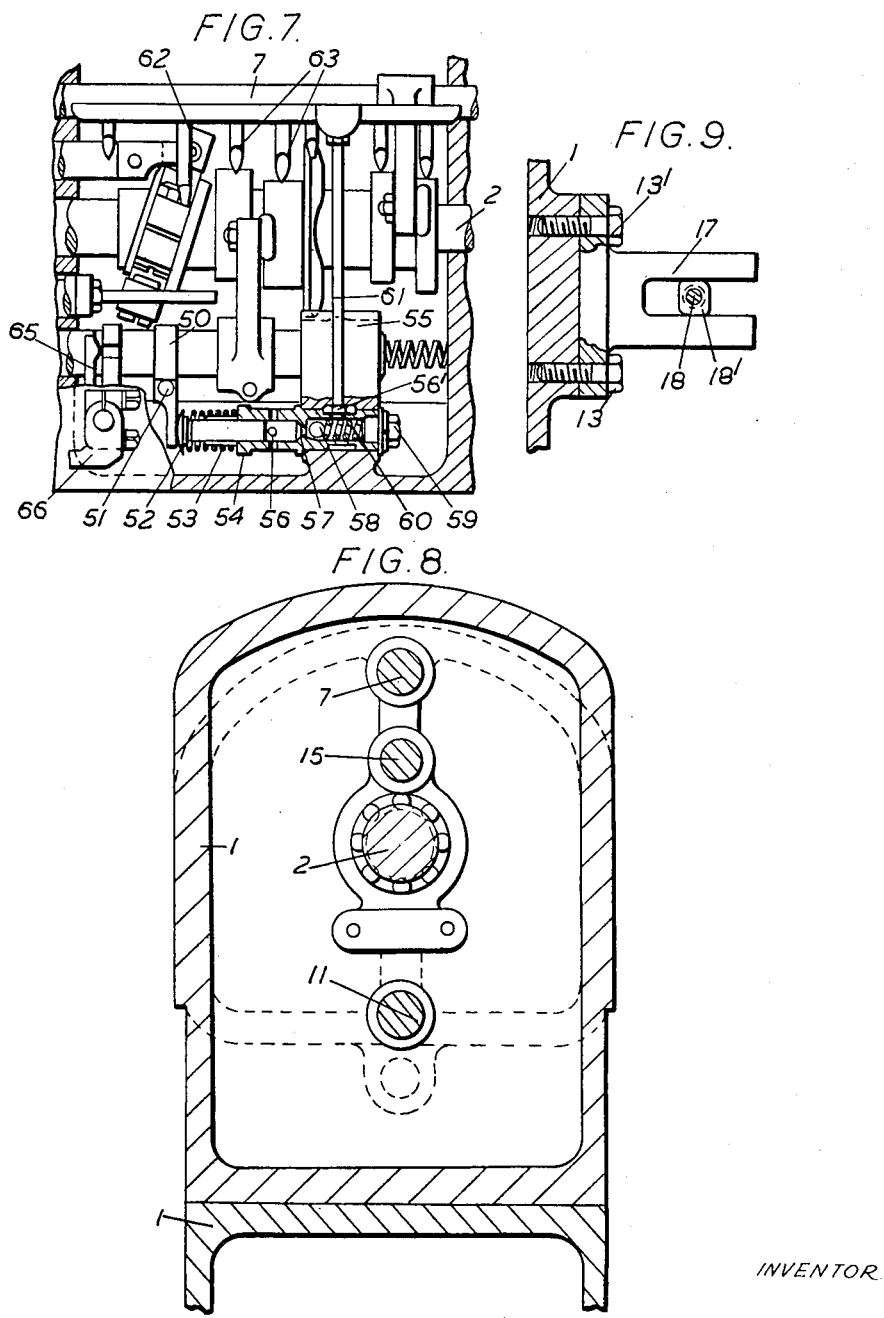

United States Patent Office 2,735,120
Patented Feb. 21, 1956

2,735,120

MACHINE FOR MANUFACTURE OF SHOE SOLES

Josef Zelinka, Gottwaldov, Czechoslovakia, assignor to Svit, narodni podnik, Gottwaldov, Czechoslovakia Application August 31, 1951, Serial No. 244,583

Claims priority, application Czechoslovakia August 31, 1950

10 Claims. (Cl. 12—85.2)

This invention relates to machines for trimming and channelling soles, preferably in the manufacture of welted and flexible boots and shoes on a last, such machines being of the type in which the tools incorporated in the machine to act upon the soles are actuated by a number of movable shafts, comprising a rotary cam shaft and upper and lower feed shafts, which are rotatable and axially movable, and usually including also an axially movable shaft called herein "the trimming-knife reciprocating rod."

Machines of this type are known in which the operation of the tools, whether it be a reciprocating movement of the trimming knife or a rocking movement of the feed member, is produced by a cam shaft arranged transversely with respect to the axes of the tools, which axes are in the longitudinal direction of the machine. It is generally necessary to derive the movement of the said cam shaft from the guide paths of the cam discs, the rollers following the said guide paths being of small diameter. Each lever actuated by means of a roller is subject to the pressure of a spring, the effect of which is that the rollers do not continuously follow the cam paths, with the result that considerable movement, knocking and considerable noise are caused, especially in the case of sudden changes of contour. This arrangement has the further disadvantage that the machine frame cannot be constructed as a closed casing to prevent the lubricating oil from splashing out. Also, the dimensions of the machine are excessive in comparison with the work which it performs.

Most of the known arrangements do not permit of an economical use of the trimming knife, and even in cases where such economical use is possible it is greatly limited due to the restricted amount of factory space available. In general, it is only possible to employ short knives which must often be replaced after having been re-ground a number of times; or curved knives are employed, which are costly to produce.

All the aforesaid disadvantages are avoided by a machine constructed in accordance with the invention, the essential feature of which is that in a machine of the type stated the tool-actuating shafts are each arranged with its axis in a vertical plane extending in the longitudinal direction of the machine. With the arrangement according to the invention, the whole driving mechanism for the working tools can be enclosed in an oil-tight casing of minimum internal volume. Moreover, in the arrangement according to the invention the movements of the shafts actuating the tools, i. e. of the upper feed shaft and the lower feed shaft, are derived positively from cams on the cam shaft through forked levers and relatively large rollers, without the use of spring force hitherto necessary to press them forcibly against the peripheries of the cams, so that a machine is obtained which is free from any disadvantageous vibration and is noiseless. Hitherto, such vibration has been transmitted in a harmful manner to both hands of the operator.

Further features of the present invention will appear from the accompanying drawings and from the following description.

An embodiment of the invention is illustrated by way of example in the accompanying drawings, in which:

Fig. 1 is a longitudinal section through the machine;

Fig. 2 is a fragmentary cross-section showing forked levers together with rollers and the position thereof in relation to the cam shaft of the machine;

Fig. 3 is a plan view;

Fig. 4 is a fragmentary perspective view of the cam shaft with a disc having an undulating cam path on the face thereof, from which the axial movement of the upper feed shaft is derived, and a forked lever which transmits a rocking motion to the lower feed shaft;

Fig. 5 is a fragmentary section through the cam shaft and a two-part connecting member, showing the trimming-knife support and the reciprocating rod;

Fig. 6 is a fragmentary perspective view of means for effecting axial feed of the lower feed shaft;

Fig. 7 is a side elevation of the interior of the machine casing and a fragmentary section through a lubricating pump showing the oil control;

Fig. 8 is a section on the line 8—8 of Fig. 1;

Fig. 9 is a detail view.

The cam shaft 2 is mounted within the machine frame 1, at one end in a swivel bearing 3 and at the other end in a ball bearing 4, which is arranged in a flanged fitting 5 in the machine frame 1. The ball bearing 4 is sealed by a ring 4' secured to the flange 5 by means of screws 5'. Keyed on the cam shaft 2 there is a disc, which has an undulating cam track 9 on its face to impart axial movement to the upper feed shaft 7, and a cam 6 to impart rocking movement to the feed shaft.

There is keyed on the cam shaft 2 a cam 10 to impart rocking movement to the lower feed shaft 11, which is mounted in bushes 12 in the machine frame 1.

There is also keyed to the cam shaft 2, for imparting axial movement to a forked rod 15, the inner member 13 of an inclined swash-plate device, the member 13 being rotatably arranged inside the outer member 14 of said device, which outer member is a so-called "wobbler." This wobbling member 14 is universally jointed to the tines 15' of the forked rod 15 for supporting the trimming knife 16 through a sleeve 14'. The universal joint comprises a stub $14^2$ projecting from the wobbler 14 and a pivotal connection $15^2$ between the tines $15^1$ and the sleeve, which is slidable on the stub. The tines 15' project from an end piece secured by a pin 16' and a screw 17' to the rod. The outer member 14 is also provided with a pin 18 having a sliding element 18'. The sliding element 18' is movably guided in a longitudinal guide 17, which is secured within the casing by screws 13' to the frame 1 (Figs. 1, 4, 5 and 9).

The cam shaft 2 is driven by a motor 19 through a pulley 20, a V-belt 21 and a pulley 22.

Arranged on the upper feed shaft 7 is a forked lever 24, which is held fast to said shaft by a screw 23 (Fig. 2). On the ends of the two arms of the lever 24 rollers 25, 25' are rotatably mounted on pins 26, 26', the pin 26 being of eccentric form so that its roller 25 is adjustable in relation to the roller 25'. Rocking feed movement is transmitted to the upper feed shaft 7 by the forked lever 24 from cam 6 rigidly keyed at 6' on the cam shaft 2.

One arm of the forked lever 24 carries the base 27' of a pin 27, which connects the lever 24 by contact with a rock lever 28, which is pivotally mounted on a pivot pin 29 fixed on the machine frame (Fig. 2). A tension spring 30 is engaged at one end in an eyelet 31 on the machine frame, while at the other end it is connected to an eyelet 32 on the lever 24. The pull exerted by the spring 30 on the lever 24 is transmitted by the pin 27 to the lever 28, the end of which carries a roller freely rotatable on a pin 34, which roller is thus always pressed against the disc having the face cam path 9.

The upper feed shaft 7 is journalled in bearing bushes 8 pressed into the machine frame 1 and has a feed cheek 35 on its forward end. The lower feed shaft 11 is also journalled in bearing bushes 12 pressed into the machine frame 1. The rear end of the shaft 11 is subject to the pressure of a spring 36 inside the machine frame 1. The spring 36 is adjustable by means of a screw 37 turnable in a sleeve 38, and the sleeve 38 is secured against turning by a pin 78 fixed in the machine frame 1. The forward end of the lower feed shaft 11 is provided with a guide 39 for the holder 40 of a channelling knife 41 and with a boot or shoe support 42 (Fig. 1).

A forked lever 75 is secured to the lower feed shaft 11, the two ends of the said lever supporting rollers 76 and 76', which as Fig. 2 shows are rotatably mounted on pins 77 and 77', the former of which is of eccentric form, so that the roller 76 can be adjusted in relation to the roller 76'. The forked lever 75 with the rollers 76, 76' transmits rocking movement from a cam 10, which is rigidly mounted on the cam shaft 2, to the lower feed shaft 11 (Fig. 1, 2 and 4).

The rod 15 is guided in bearing bushes 44 and is provided at its outer end with a holder 45 for the trimming knife 16, which is adjustable by means of a screw 47 (Fig. 1). According to requirement, the channelling knife 41 can be adjusted by screws 43 and a washer 46 in the guide 39 of the holder 40 (Fig. 1).

Provided on the lower feed shaft 11 are a collar 49 secured by a screw 48 and a pressure arm 50 held fast by a screw 51. An oil pump plunger head 52 subjected to the action of a spring 53 presses on said pressure arm, the plunger's other end entering the oil pump cylinder 54, which is rigidly mounted in a support 55 on the lower closed casing portion of the machine frame 1 (Figs. 1 and 7).

The pump cylinder has radial suction and outlet ports 56, 56' respectively and its central discharge bore 57 (Fig. 7) has a steel closure ball 58 which is controlled by a pressure spring 60 abutting against a screw 59. Provided on the support 55 in the closed interior of the frame casing 1 is a vertical tubular duct 61, the lower end of which is jointed into the support 55 so as to communicate with the outlet port 56' in the pump cylinder. The upper end of the tubular duct 61 has a horizontal distribution pipe 62 extending in the longitudinal direction of the machine and having suitable outlet apertures 63. The said apertures are preferably so situated that the lubricating oil is distributed in known manner directly on the associated lubricating points within the frame casing 1. Keyed on a shaft 64 (Figs. 1 and 6) which is journalled in sealed bearings in the casing 1 of the machine frame, is a lever 65 that is secured by a screw 79, which lever engages the collar 49 on the lower feed shaft 11. There is rigidly clamped on the outer end of the shaft 64, a lever 66 which is attached by a tie rod 67 to one arm of a two-armed lever 68 which is fulcrumed on a pin 69, and the other arm of which is connected by another tie-rod 67' to a pedal lever 70, at the right-hand side, the lever 70 being pivotally mounted on a pin 71. Both pins 69 and 71 are fixtures on the machine frame 1. The pedal lever 70 is held up by a spring 72, one end of which engages an eyelet 74 on the machine frame while the other end engages an eyelet 73 on the pedal lever 70.

The machine described operates in the following manner:

In order that say a shoe may be placed in the required working position on the support 42, the pedal lever 70 is depressed, so that the distance between the channelling knife 41 and the feed cheek 35 of the upper feed shaft 7 is increased, this being due to the fact that the lever 65 bearing on the collar 49 (Fig. 6) forces the lower feed shaft 11 to move axially rearwards against the resistance of the spring 36. The shoe B (Fig. 1) is placed in the gap thus formed and the pedal lever is released, so that the shaft 11, with the support 42, again takes up the previous position on the shoe under the return action of the spring 36, the shoe held by the two hands of the operator being immediately set in motion (Fig. 1), the knife 16 trimming the edge of the sole and the knife 41 forming a channel for the sole seam at the maximum distance from the edge of the sole. When the sole has been completely trimmed and channelled, the operator again depresses the pedal lever 70, again imparting a rearward axial movement to the lower feed shaft 11 through the linkage 67', 68 and 67. Due to this rearward movement, the distance between the boot or shoe support 42 and the feed cheek 35 is again increased, so that the shoe can be removed.

Simultaneously with each depression of the pedal lever 70, the arm 50 fixed to the lower feed shaft 11 presses the oil pump plunger 52 rearwards against the spring 53 so that the pressure oil dislodges the ball 58 against the spring 60 and oil previously sucked through the ports 56, into the pump cylinder 54 is discharged through the pipe 61, the horizontal distribution pipe 62 and the outlet apertures 63 to the individual lubricating points.

The feed cheek 35 has imparted to it by the upper feed shaft 7 recurrent axial movements to and from the channelling knife 41 and rocking movement around the axis of the shaft 7, these axial and rocking movements both being transmitted to the shaft 7 through the single arm 24 thereon.

Fig. 8 illustrates the simplicity and lateral compactness of the arrangement attained by virtue of the various operative connections between the cams 6, 9 and 10 and the swash-plate 13 all on the cam shaft 2, the upper shaft 7, rod 15, cam shaft 2 and lower shaft 11 all being vertically above each other.

It will be seen, Fig. 1, that the trimming-knife rod 15 extends beyond the end bearing 3 of the cam shaft 2, there being provided as an axial continuation of the cam shaft an open space into which the knife 16 projects. It is by virtue of this arrangement that an exceptionally long knife can be used, as hereinbefore stated.

I claim:

1. In a machine for trimming and channelling shoe and other footwear soles and of the type including a machine frame, a longitudinal rotary cam shaft, which actuates the trimming, channelling and associated tools of the machine, bearings in said frame in which said shaft is journalled, a longitudinal upper feed shaft, a longitudinal trimming-knife rod, and a longitudinal lower channelling-knife shaft, said shafts and rod being borne by said frame and individually carrying the respective tools; the combination of bearings for the cam shaft, the upper and lower shafts and the rod, said bearings all being arranged in approximately the same vertical plane, so that the upper feed shaft, the trimming-knife rod, the cam shaft and the lower channelling-knife shaft are all arranged immediately above each other, first and second cams on the cam shaft, a dependent arm on the upper feed shaft, said first and second cams both acting on said arm to rock said feed shaft and move it longitudinally, an upright arm on said lower channelling-knife shaft, which is rockable by said upright arm, a third cam on the cam shaft for rocking said upright arm, a motion-converting device on the cam shaft and an operative connection between said device and said trimming-knife rod for transmitting longitudinal reciprocation to this rod.

2. In a machine for trimming and channelling shoe and other footwear soles and of the type comprising as tool-actuating shafts a rotary cam shaft, an upper feed shaft and a lower feed shaft, a machine casing in which said shafts are mounted, bearings in said casing, in which bearings said shafts are journalled, said bearings being arranged so that the axes of all of said shafts are in a vertical plane extending lengthwise of said machine, cams on said cam shaft, two forked levers one of them on said upper feed shaft and the other on said lower feed shaft, a pair of rollers on each of said levers engaging said cams, respectively, so as to positively transmit rocking movements through said levers to the respective feed shafts, an additional lever pivoted on the machine casing, a face-cam on the cam-shaft, the face of said cam presenting an undulating path, a roller on said additional lever engaging said face-cam so as to follow said path, and contact means interposed between said forked lever on said upper feed shaft and said additional lever for transmission of axial movement from said face-cam to the upper feed shaft.

3. In a machine as defined in claim 2 also having a longitudinally movable shaft constituting a trimming-knife reciprocating rod above the aforesaid cam shaft and a bearing in the machine casing for said rod arranged so that the axis of said rod is in the aforesaid lengthwise extending vertical plane, a motion-converting device on the cam shaft operatively connected to said rod to reciprocate it longitudinally, said device comprising an inclined rotary swash-plate secured to the cam shaft, a non-rotary wobbler embracing said swash-plate, an upper and a lower projection on said wobbler, a stationary guide on said casing, said guide engaging said lower projection and constraining the wobbler to motion in a longitudinal plane, and an operative connection between said upper projection and rod for transmitting longitudinal reciprocation to the rod.

4. A machine as defined in claim 3 in which the trimming-knife reciprocating rod and its bearing are arranged to extend longitudinally beyond the cam shaft and its bearings to provide a clear space overhung by said rod, a holder dependent from said rod and a trimming knife on said holder registering with said space.

5. In a machine for trimming and channelling shoe and other footwear soles and of the type comprising as tool-actuating shafts a rotary cam shaft, an upper feed shaft, a lower feed shaft and a trimming-knife shaft between the cam shaft and the upper feed shaft, a machine casing in which said shafts are mounted, bearings in said casing, in which bearings said shafts are movable, said bearings being arranged so that the axes of all of said shafts are horizontal and in a vertical plane extending lengthwise of said machine, cams on said cam shaft, two levers one of them on said upper feed shaft and the other on said lower feed shaft, said levers engaging said cams, respectively, so as to positively transmit rocking movements through said levers to the respective feed shafts, additional cam means on the cam shaft operatively connected with the upper feed shaft through the lever thereon to effect longitudinal movement of the upper feed shaft, operator-actuated means applied to the lower feed shaft to move it longitudinally to and fro relative to the casing and to the cam shaft, and a swash plate device on the cam shaft, said device comprising a wobbler connected with the trimming-knife shaft and having a connection with the casing to constrain the wobbler against rotation and an oblique component rotating with the cam shaft and transmitting a longitudinal reciprocation through the wobbler to the trimming-knife shaft.

6. A machine as defined in claim 5 in which the trimming-knife shaft and its bearing are arranged to extend longitudinally beyond the cam shaft and its bearings to provide a clear space overhung by said trimming-knife shaft, a holder dependent therefrom and a trimming knife on said holder registering with said space.

7. In a machine for trimming and channelling shoe and other footwear soles and comprising a rotary cam shaft, an upper feed shaft carrying a feed member, a lower feed shaft carrying a channelling knife and footwear support, each of said feed shafts being both turnable to-and-fro and axially movable, an axially movable shaft constituting a trimming-knife carrier, operative connections between said cam shaft and each of said other shafts, a casing enclosing all of said shafts and bearings in said casing for each of said shafts, said bearings being arranged one above each other so that the axes of all of said shafts are parallel and approximately in the same vertical longitudinal plane, the operative connection between said cam shaft and said upper feed shaft comprising a cam on said cam shaft, a forked lever on said upper feed shaft, the fork engaging opposite sides of said cam to transmit positive turning movements to said upper feed shaft in both directions, a face-cam on said cam shaft, a second lever pivoted to said casing and engaging said face-cam, being rocked to-and-fro under the control of said face-cam, and contact means interposed between said two levers for transmission of axial movement from said face-cam through both levers to the upper feed shaft.

8. A machine as defined in claim 7, in which the operative connection between the aforesaid cam shaft and the aforesaid trimming-knife-carrier shaft comprises an inclined rotary swash-plate secured to the cam-shaft, a non-rotary wobbler embracing said swash-plate, upper and lower projections on said wobbler, a stationary guide on the machine casing, said guide engaging said lower projection and constraining the wobbler to motion in a longitudinal plane, and an operative connection between said upper projection and the trimming-knife-carrier shaft transmitting axial reciprocation to this shaft.

9. A machine as defined in claim 7 in which the trimming-knife-carrier shaft and its bearing are arranged to extend longitudinally beyond the cam shaft and its bearings to provide a clear space overhung by said trimming-knife-carrier shaft, a holder dependent therefrom and a trimming knife on said holder registering with said space.

10. In a machine for trimming and channelling shoe and other footwear soles and including a rotary cam shaft, an upper feed shaft carrying a feed member, said feed shaft being both turnable to-and-fro and axially movable, an operative connection between said cam shaft and said upper feed shaft whereby said feed shaft derives its movements, a casing enclosing said shafts and bearings in said casing for each of said shafts, said bearings being arranged one above the other so that the axes of said shafts are horizontal and in the same vertical longitudinal plane, the operative connection comprising a cam on said cam shaft, a forked lever on said upper feed shaft, the fork engaging opposite sides of said cam to transmit positive turning movements to said upper feed shaft in both directions, a face-cam on said cam shaft, a second lever pivoted to said casing and engaging said face-cam, being rocked to-and-fro under the control of said face-cam, and contact means interposed between said two levers for transmission of axial movement from said face-cam through both levers to the upper feed shaft.

References Cited in the file of this patent

UNITED STATES PATENTS

| | | |
|---|---|---|
| 171,572 | Juengst | Dec. 28, 1875 |
| 878,478 | English | Feb. 4, 1908 |
| 1,030,606 | Perry | June 25, 1912 |
| 1,742,491 | Widder et al. | Jan. 7, 1930 |
| 1,797,547 | Class | Mar. 24, 1931 |
| 2,164,518 | Hart | July 4, 1939 |
| 2,339,784 | Kocher | Jan. 25, 1944 |
| 2,475,033 | Lane | July 5, 1949 |
| 2,508,360 | Baker | May 23, 1950 |
| 2,582,912 | Oldham et al. | Jan. 15, 1952 |

FOREIGN PATENTS

| | | |
|---|---|---|
| 239,597 | Great Britain | Sept. 11, 1925 |